United States Patent [19]

Edwards

[11] 4,357,432

[45] Nov. 2, 1982

[54] VULCANIZATES

[75] Inventor: Douglas C. Edwards, Sarnia, Canada

[73] Assignee: Polysar Limited, Sarnia, Canada

[21] Appl. No.: 262,689

[22] Filed: May 11, 1981

[51] Int. Cl.³ .......................... C08K 3/04; C08K 3/36; C08J 3/24; C08J 3/16

[52] U.S. Cl. .................................. 523/351; 523/344; 524/251; 524/257; 524/322; 524/394; 524/433; 524/456; 524/501; 524/517; 524/523; 524/526

[58] Field of Search ............... 260/42.28, 42.37, 42.36, 260/42.47, 23.7 M, 23.7 N; 523/351, 344; 524/456, 433, 501, 517, 523, 526, 322, 394, 251, 257

[56] References Cited

U.S. PATENT DOCUMENTS

| | | | |
|---|---|---|---|
| 3,696,061 | 10/1972 | Selsor et al. | 260/34.2 |
| 3,700,620 | 10/1972 | Burke, Jr. | 260/34.2 |
| 3,700,621 | 10/1972 | Burke, Jr. | 260/42.55 |
| 3,704,196 | 11/1972 | Callan | 260/42.36 |
| 4,150,014 | 4/1979 | Edwards et al. | 260/42.37 |
| 4,150,015 | 4/1979 | Edwards et al. | 260/42.33 |
| 4,152,308 | 5/1979 | Edwards et al. | 260/42.37 |
| 4,169,822 | 10/1979 | Kutch et al. | 260/42.47 |
| 4,179,421 | 12/1979 | Edwards et al. | 260/23.7 M |
| 4,229,333 | 10/1980 | Wolff et al. | 260/42.37 |

*Primary Examiner*—Melvyn I. Marquis
*Assistant Examiner*—Herbert J. Lilling
*Attorney, Agent, or Firm*—Stevens, Davis, Miller & Mosher

[57] ABSTRACT

A process, and the product of the process, is provided for the production of improved rubbery vulcanizates which contain both of silica or calcium silicate and carbon black as the fillers and two polymers one of which contains hydroxy or epoxy groups. Such vulcanizates may be used in tires, general purpose goods such as belting, and the like.

11 Claims, No Drawings

VULCANIZATES

FIELD OF THE INVENTION

This invention is directed to improved rubbery vulcanizates which contain a mixture of carbon black and silica or calcium silicate as the filler, wherein the polymer of the vulcanizates is comprised of two polymers one of which contains hydroxy or epoxy groups.

DESCRIPTION OF THE PRIOR ART

Much has been published regarding the effects on the vulcanizate properties of the inclusion in the vulcanization of one or more fillers. Vulcanizates frequently contain a mixture of fillers with one or more of the fillers usually being of the reinforcing type and other filler or fillers generally being of the non-reinforcing type. The various carbon blacks, silicas and calcium silicate are well known fillers and are known to be used in admixture in vulcanizates.

Canadian Pat. Nos. 1,094,720, 1,094,721 and 1,096,084 and U.S. Pat. No. 4,150,014 teach that the properties of silica and calcium silicate filled vulcanizates can be markedly improved if a polymer containing hydroxy or epoxy groups is mixed with the filler, optionally in the presence of specified additives, the mixing being at an elevated temperature and under shearing conditions.

SUMMARY OF THE INVENTION

It is an objective of the present invention to provide improved rubbery vulcanizates which contain both of silica or calcium silicate and carbon black as the fillers.

It is a further objective of the present invention to provide a process for the production of improved rubbery vulcanizates which contain both of silica or calcium silicate and carbon black as the fillers.

DESCRIPTION OF THE INVENTION

In accordance with the invention, there is provided an improved rubbery vulcanizate by the vulcanization of a mixture comprising vulcanization active agents, at least two synthetic polymers and at least two fillers, said at least two fillers being one of silica or calcium silicate and the other being carbon black, said at least two synthetic polymers being (A) a $C_4$-$C_6$ conjugated diolefin containing polymer which contains, per 100 grams of polymer, chemically bound in the polymer from about 1.5 to about 80 millimoles of hydroxy groups or from about 4 to about 60 millimoles of epoxy groups which polymer is mixed with said silica or calcium silicate and optionally other compounding ingredients, and (B) a $C_4$-$C_6$ conjugated diolefin containing polymer which is mixed with said carbon black and optionally other compounding ingredients prior to being mixed with the polymer A-filler mixture, the mixture comprising, per 100 parts by weight of total polymer, from about 20 to about 80 parts by weight of polymer A, from 20 to about 80 parts by weight of polymer B, from about 5 to about 100 parts by weight of silica or calcium silicate, from about 5 to about 100 parts by weight of carbon black to provide a weight ratio of silica or calcium silicate to carbon black of from about 20:80 to about 65:34 and optionally an additive selected from (i) 0.5 to 5 parts by weight of an amine of the formula

where R is a $C_4$-$C_{30}$ linear or branched alkyl or alkylene group which may contain one $NH_2$ or NH group or a $C_4$-$C_{30}$ cycloalkyl group or a $C_7$-$C_{20}$ alkaryl group connected to the nitrogen atom through the alkyl component of the alkaryl group, R' is a $C_1$-$C_{30}$ linear or branched alkyl or alkylene group and R" and R"', which may be the same or different, is a $C_1$-$C_{10}$ alkyl group, or (ii) from about 1 to about 5 parts by weight of an organic acid or salt thereof selected from the $C_{15}$-$C_{20}$ saturated or unsaturated fatty acids or the alkali metal, alkaline earth metal or ammonium salts thereof, or (iii) from about 1 to about 10 parts by weight of magnesium oxide, said silica or calcium silicate having been mixed with said polymer A and said additive under conditions of shear at a temperature of from about 100° C. to about 190° C. prior to being mixed with the polymer B-carbon black mixture.

Still further in accordance with the invention, there is provided a process for the production of improved rubbery vulcanizates which process comprises the steps of (1) mixing for from about 0.25 to about 10 minutes under conditions of shear at a temperature of from about 100° to about 190° C. from about 20 to about 80 parts by weight of polymer A, said polymer A being a $C_4$-$C_6$ conjugated diolefin containing polymer which contains, per 100 grams of polymer, chemically bound in the polymer from about 1.5 to about 80 millimoles of hydroxy groups or from about 4 to about 60 millimoles of epoxy groups, with from about 5 to about 100 parts by weight per 100 parts by weight of polymer A of silica or calcium silica and optionally an additive selected from (i) 0.5 to 5 parts by weight of an amine of the formula

where R is a $C_4$-$C_{30}$ linear or branched alkyl or alkylene group which may contain one $NH_2$ or NH group or a $C_4$-$C_{30}$ cycloalkyl group or a $C_7$-$C_{20}$ alkaryl group connected to the nitrogen atom through the alkyl component of the alkaryl group, R' is a $C_1$-$C_{30}$ linear or branched alkyl or alkylene group and R" and R"', which may be the same or different, is a $C_1$-$C_{10}$ alkyl group, or (ii) from about 1 to about 5 parts by weight of an organic acid or salt thereof selected from the $C_{15}$-$C_{20}$ saturated or unsaturated fatty acids or the alkali metal, alkaline earth metal or ammonium salts thereof, or (iii) from about 1 to about 10 parts by weight of magnesium oxide, (2) allowing the mixture to cool and incorporating vulcanization active agents and optionally other compounding ingredients, (3) mixing from about 20 to about 80 parts by weight of polymer B, said polymer B being a $C_4$-$C_6$ conjugated diolefin containing polymer, with from about 5 to about 100 parts by weight per 100 parts by weight of polymer B of carbon black, (4) allowing the mixture to cool and incorporating vulcanization active agents and optionally other compounding ingredients, (5) mixing together the products from steps (2) and (4), the weight ratio therein of silica or calcium silicate to carbon black being from about 20:80 to about 65:35, shaping the mixture from step (5) and vulcanizing it by heating to a temperature of from 125° to about 200° C. for 1 minute to about 10 hours.

The polymers which may be used in this invention are $C_4$-$C_6$ conjugated diolefin containing polymers. The polymer which is mixed with the silica or calcium silicate is a $C_4$-$C_6$ conjugated diolefin containing polymer which also contains chemically bound in the polymer hydroxy or epoxy groups. Suitable such polymers are prepared by aqueous emulsion free radical polymerization of a $C_4$–$C_6$ conjugated diolefin such as butadiene or isoprene optionally with other monomers selected from styrene, acrylonitrile, methacrylonitrile, with polymerizable hydroxy or epoxy group containing monomers selected from hydroxyethyl acrylate or methacrylate, hydroxypropyl acrylate or methacrylate, hydroxypropyl crotonate or hydroxyethyl vinyl ether, or from glycidyl acrylate or methacrylate, allyl or methallyl glycidyl ether or vinyl cyclohexene monoxide. Such polymers are solid high molecular weight materials having Mooney viscosities generally within the range of (ML 1+4 @100° C.) about 30 to about 150. Preferred such polymers include styrene-butadiene-hydroxyethyl acrylate, styrene-butadiene-hydroxyethyl methacrylate, styrene-butadiene-glycidyl acrylate, styrene-butadiene-glycidyl methacrylate, styrene-butadiene-methallyl glycidyl ether polymers wherein the styrene content is from about 18 to about 30 weight percent. The concentration of hydroxy groups in such polymers is from about 1.5 to about 80, preferably from about 2 to about 60, millimoles of hydroxy groups per 100 grams of polymer and the concentration of epoxy groups in such polymers is from about 4 to about 60, preferably from about 5 to about 40, millimoles of epoxy groups per 100 grams of polymer. The polymer which is mixed with the carbon black is a $C_4$–$C_6$ conjugated diolefin containing polymer such as polybutadiene, poly-isoprene, butadiene-styrene polymer, isoprene-styrene polymer, butadiene-acrylonitrile polymer, butadiene-methacrylonitrile polymer and isoprene-acrylonitrile polymer. Such polymers are solid high molecular weight materials having Mooney viscosities generally with the range of (ML 1+4@100° C.) having 30 to about 150. Preferred such polymers are styrene-butadiene polymers wherein the styrene content is from about 18 to about 30 weight percent.

When an additive is used for the mixing of the polymer and the silica or calcium silicate, it is selected from an amine, an organic acid or salt thereof or magnesium oxide. The amine, used in an amount of from about 0.5 to about 5 parts by weight per 100 parts by weight of said polymer, has the formula

R—NH$_2$, R—NHR' or R—NR"R'"

wherein R is a $C_4$–$C_{30}$ linear or branched alkyl or alkylene group which may contain one NH$_2$ or NH group or a $C_4$–$C_{30}$ cycloalkyl group or a $C_7$–$C_{20}$ alkaryl group connected to the nitrogen atom through the alkyl component of the alkaryl group, R' is a $C_1$–$C_{30}$ linear or branched alkyl or alkylene group and R" and R'", which may be the same or different, is a $C_1$–$C_{10}$ alkyl group. Typical examples of such amines include hexylamine, decylamine, octadecylamine, 1,1-dimethyl decylamine, 1,1-diethyl octadecylamine, octadecylene amine, N,N-dimethyl decylamine, N,N-diethyl octadecylamine, di(dodecyl)amine, hexamethylene diamine and N,N,N',N'-tetramethyl hexamethylene diamine. Preferred amines include compounds of formula R—NH$_2$ and R—NHR' where R is a $C_{10}$–$C_{20}$ linear or branched alkyl or alkylene group which may contain one NH$_2$ or NH group and R' is a $C_{10}$–$C_{20}$ linear or branched alkyl or alkylene group. The organic acid or salt thereof, used in an amount of from about 1 to about 5 parts by weight per 100 parts by weight of polymer, is selected from the $C_{15}$–$C_{20}$ saturated or unsaturated fatty acids or the alkali metal, alkaline earth metal or ammonium salts thereof. Suitable such acids or salts include palmitic, stearic, oleic and linoleic acids and the sodium, potassium, calcium, zinc and ammonium salts thereof. The magnesium oxide is used in an amount of from about 1 to about 10 parts by weight per 100 parts by weight of polymer.

The silica or calcium silicate which is mixed with the hydroxy or epoxy group containing polymer is preferably of fine particle size, that is generally less than about 0.1 micron but larger than about 0.01 micron average particle size. Suitable such silica includes both the fumed silica and the precipitated silicas and suitable such calcium silicate is the precipitated product. The amount of silica or calcium silicate that is mixed with the hydroxy or epoxy group containing polymer is from about 5 to about 100, preferably from about 30 to about 75, parts by weight per 100 parts by weight of said polymer. As is well known in the art, certain grades of silica are difficult to mix with polymers and the person skilled in the art would know to use lesser amounts, such as from about 5 to about 60 parts by weight per 100 parts by weight of polymer, of such grades of silica.

The carbon black that is mixed with the polymer is of the type generally known as the reinforcing blacks and includes but is not necessarily limited to those known by the designations SAF, ISAF, HAF, FEF, GPF and SRF. Such carbon blacks are well known in the industry. The amount of carbon black mixed with the polymer is from about 5 to about 100, preferably from about 30 to about 75, parts by weight per 100 parts by weight of polymer.

The quantity of hydroxy or epoxy group containing polymer for mixing with the silica or calcium silicate is from about 20 to about 80 parts by weight and the quantity of polymer for mixing with the carbon black is from about 20 to about 80 parts by weight for a total of 100 parts by weight of polymers. The weight ratio of silica or calcium silicate to carbon black in the final mixture is from about 20:80 to about 65:35.

Other conventional compounding ingredients may be mixed with the polymers and fillers including extender oils, plasticizers, antioxidants, antiozonants, zinc oxide, stearic acid and tackifiers.

Vulcanization active agents which may be mixed with the polymer-filler mixtures are those well known in the art and include the peroxidic agents and the sulphur or sulphur-containing agents. Suitable vulcanization active agents are chosen to match the nature of the polymer and the intended use for the vulcanizate and selection of the vulcanization active agents is not critical to this invention. The vulcanization active agents are generally mixed with the polymer-filler mixtures at relatively low temperatures, usually below about 65° to 75° C. The final mixed components are vulcanized by heating, for example at temperatures of from 125° to about 200° C. for times of from about 1 minute to 10 hours and usually at temperatures of from about 150° to about 170° C. for about 3 to about 60 minutes.

The mixing of the hydroxy or epoxy-group containing polymer with the silica or calcium silicate and the additive, when present, is important-it is necessary that the mixing include a period when the mixture is sheared at an elevated temperature. Such shearing may be accomplished on a two roll rubber mill or in an internal mixer and may be during the mixing of the polymer, filler and additive or as a subsequent step to such mixing. The elevated temperature is from about 100° to about 190° C., preferably from about 120° to about 180° C. The mixture is subjected to shearing at the elevated temperature for a time of from about 0.25 to about 10 minutes, preferably from about 0.5 to about 5 minutes.

The mixing of the polymer and carbon black is conventional in the industry and may be on a two roll rubber mill or in an internal mixer at temperatures and for times well known in the industry or may be as in the manufacture of a polymer-carbon black masterbatch. Preferably, the polymer and carbon black are mixed on a mill or in an internal mixer.

The mixture of polymer, silica or calcium silicate and additive which has been subjected to shearing at elevated temperature may, after cooling, have vulcanization active agents and other compounding ingredients incorporated directly or may be mixed with the polymer-carbon black mixture. The polymer-carbon black mixture may, after cooling if necessary, have vulcanization active agents and other compounding ingredients incorporated directly or may be mixed with the polymer-silica or calcium silicate-additive mixture. Alternatively, the vulcanization active agents and other compounding ingredients may be added to a mixture of the polymer-silica or calcium silicate-additive mixture and the polymer-carbon black mixture. Preferably, the mixture of polymer, silica or calcium silicate and additive containing all other compounding ingredients and vulcanization active agents is mixed, at a temperature below about 75° C., with the mixture of polymer and carbon black also containing all other compounding ingredients and vulcanization active agents. The final mixture is vulcanized by heat.

The vulcanizates of the present invention may be used in, for example, tires, general purpose goods such as belting, and the like.

The following examples serve to illustrate but not limit the invention.

EXAMPLE 1

Polymer A was a styrene-butadiene-hydroxyethyl methacrylate polymer containing about 23 weight percent of styrene and having 8.5 millimoles per 100 grams of polymer of hydroxy groups. The polymer had a Mooney (ML 1+4@100° C.) of about 50. Polymer B was a styrene-butadiene polymer containing about 23 weight percent of styrene and having a Mooney (ML 1+4@100° C.) of about 50. Mixture 1, which contained Polymer A, and Mixture 2, which contained Polymer B, were prepared as shown in Table I, all parts being parts by weight. The amine additive ARMEEN* 2C is dicocoamine having as its major component $(C_{12}H_{25})_2NH$.
*Trade Mark Mixtures of Mixture 1 and Mixture 2 were prepared, in the ratios shown in Table II, on a cool rubber mill, the mixtures formed into sheets and vulcanized by heating for the times shown at 160° C. The stress-strain and other properties of the vulcanizates are shown in Table II.

In Table II, Experiments #1, 5 and 6 are controls and Experiments #2-4 are within the scope of the present invention. The overall balance of properties for each vulcanizate of the invention is unexpected-while the stress-strain and tensile set do not appear to be unexpected, the improvements in tear, compression set, deMattia flex and rotary resilience are most unexpected and cannot, at present, be accounted for.

TABLE I

Preparation of Mixture 1

| | |
|---|---|
| Polymer A | 100 |
| Additive (ARMEEN* 2C) | 1.5 |
| Silica (HISIL* 233) | 55 |
| Oil (SUNTHENE* 480) | 3 |

Add Polymer A and Additive to BANBURY* with rotor running at 77 rpm; after 0.5 minutes add silica and oil; continue mixing, when temperature reaches about 150° C. turn on cooling water. Dump mixture after 6.5 minutes (temperature about 177° C.) and allow to cool - Mix A.

| | |
|---|---|
| Mix A | 159.5 |
| Zinc oxide | 3 |
| Stearic acid | 1.5 |
| Santoflex 13 | 0.5 |
| Santoflex 77 | 0.5 |
| DPG | 0.3 |
| Santocure NS | 1.2 |
| Sulphur | 2.5 |

Band Mix A on a cool rubber mill (about 50° C.) then add each of the other components and mill until thoroughly mixed. Remove from mill.

Preparation of Mixture 2

| | |
|---|---|
| Polymer B | 100 |
| Carbon black (N-220 type) | 50 |
| Zinc oxide | 3 |
| Stearic acid | 1.5 |
| Santoflex 13 | 0.5 |
| Santoflex 77 | 0.5 |
| Oil (Sundex* 8125) | 3 |

Add Polymer B to Banbury with rotor running at 77 rpm and temperature initially at 100° C. Turn on cooling water. Rapidly add one half of the carbon black, zinc oxide, stearic acid and continue the mixing. At 1.5 minutes add the other half of the carbon black, zinc oxide, stearic acid and all the other components. Continue mixing, dump after 4 minutes and allow to cool - Mix B.

| | |
|---|---|
| Mix B | 158.5 |
| DPG | 0.3 |
| Santocure NS | 1.2 |
| Sulphur | 2.0 |

Band Mix B on a cool rubber mill (about 50° C.) then add each of the other components and mill until thoroughly mixed. Remove from mill.

*Trade Marks

TABLE II

| Experiment # | 1 | 2 | 3 | 4 | 5 | 6 |
|---|---|---|---|---|---|---|
| Mixture 1 | 0 | 33.8 | 67.6 | 101.4 | 135.2 | 169 |
| Wt. of Polymer A | 0 | 20 | 40 | 60 | 80 | 100 |
| Wt. of Silica | 0 | 11 | 22 | 33 | 44 | 55 |
| Mixture 2 | 162 | 129.6 | 97.2 | 64.8 | 32.4 | 0 |
| Wt. of Polymer B | 100 | 80 | 60 | 40 | 20 | 0 |
| Wt. of Carbon Black | 50 | 40 | 30 | 20 | 10 | 0 |
| Vulcanization Time (minutes) | 10 | 10 | 10 | 10 | 15 | 19 |
| Vulcanizate Properties | | | | | | |
| Hardness Shore A | 71 | 65 | 63 | 60 | 61 | 65 |
| 100% Modulus MPa | 2.9 | 2.2 | 1.5 | 1.6 | 1.5 | 1.7 |
| 300% Modulus MPa | 17.3 | 12.9 | 9.1 | 8.0 | 9.0 | 10.5 |
| Tensile Strength MPa | 28.0 | 27.4 | 26.0 | 25.4 | 25.0 | 23.0 |
| Elongation % | 400 | 500 | 580 | 610 | 540 | 500 |
| Tensile Set % | 8 | 10 | 16 | 20 | 20 | 20 |
| Tear - Die C kN/M | 52 | 57 | 54 | 51 | 51 | 48 |
| Trouser Tear kN/M | 9 | 11 | 14 | 16 | 12 | 18 |
| Compression Set % (22 h @ 100° C.) | 26 | 26 | 39 | 49 | 85 | 83 |
| Abrasion Resistance | | | | | | |
| Akron % | 139 | 107 | 96 | 71 | 54 | 38 |
| NBS % | 313 | 239 | 202 | 180 | 188 | — |
| DeMattia Flex | | | | | | |
| to 300% kcy | 1 | 8 | 26 | 32 | 16 | 6 |
| to 600% kcy | 2 | 22 | 76 | 90 | 65 | 41 |
| Goodrich Flexometer (55° C., 17.5%) | | | | | | |
| Permanent Set % | 0.8 | 1 | 1.6 | 1.8 | 1.2 | 1 |
| Heat Build-Up °C. | 22 | 22 | 23 | 22 | 19 | 19 |
| Dunlop Rotary Resilience | | | | | | |
| 1.9 mm deflection at 25° C. | 4.7 | 4.6 | 3.3 | 3.0 | 2.5 | 2.6 |
| 50° C. | 3.5 | 3.1 | 2.4 | 2.2 | 1.8 | 1.9 |
| 75° C. | 2.6 | 2.3 | 1.8 | 1.8 | 1.4 | 1.5 |

TABLE II-continued

| Experiment # | 1 | 2 | 3 | 4 | 5 | 6 |
|---|---|---|---|---|---|---|
| 100° C. | 2.1 | 1.8 | 1.6 | 1.5 | 1.2 | 1.2 |
| 20 kg load at 25° C. | 2.7 | 2.8 | 2.7 | 2.6 | 2.3 | 2.2 |
| 50° C. | 2.5 | 2.6 | 2.5 | 2.4 | 2.1 | 1.9 |
| 75° C. | 2.3 | 2.3 | 2.3 | 2.2 | 1.9 | 1.7 |
| 100° C. | 2.1 | 2.2 | 2.2 | 2.2 | 1.8 | 1.6 |

What is claimed is:

1. An improved rubbery vulcanizate is provided by the vulcanization of a mixture comprising vulcanization active agents, at least two synthetic polymers and at least two fillers, said at least two fillers being one of silica or calcium silicate and the other being carbon black, said at least two synthetic polymers being (A) a $C_4$–$C_6$ conjugated diolefin containing polymer which contains, per 100 grams of polymer, chemically bound in the polymer from about 1.5 to about 80 millimoles of hydroxy groups or from about 4 to about 60 millimoles of epoxy groups and selected from styrene-butadiene-hydroxyethyl acrylate, styrene-butadiene-hydroxyethyl methacrylate, styrene-butadiene-glycidyl acrylate, styrene-butadiene-glycidyl methacrylate and styrene-butadiene-methallyl glycidyl ether polymers, which polymer is mixed with said silica or calcium silicate and optionally other compounding ingredients, and (B) a $C_4$–$C_6$ conjugated diolefin containing polymer which is mixed with said carbon black and optionally other compounding ingredients prior to being mixed with the polymer A-filler mixture, the mixture comprising, per 100 parts by weight of total polymers, from about 20 to about 80 parts by weight of polymer A, from about 20 to about 80 parts by weight of polymer B, from about 5 to about 100 parts by weight of silica or calcium silicate, from about 5 to about 100 parts by weight of carbon black to provide a weight ratio of silica or calcium silicate to carbon black of from about 20:80 to about 65:35 and optionally an additive selected from (i) 0.5 to 5 parts by weight of an amine of the formula

R—$NH_2$, R—NHR' or R—NR"R'"

where R is a $C_4$–$C_{30}$ linear or branched alkyl or alkylene group which may contain one $NH_2$ or NH group or a $C_4$–$C_{30}$ cycloalkyl group or a $C_7$–$C_{20}$ alkaryl group connected to the nitrogen atom through the alkyl component of the alkaryl group, R' is a $C_1$–$C_{30}$ linear or branched alkyl or alkylene group and R" and R'", which may be the same or different, is a $C_1$–$C_{10}$ alkyl group, or (ii) from about 1 to about 5 parts by weight of an organic acid or salt thereof selected from the $C_{15}$–$C_{20}$ saturated or unsaturated fatty acids or the alkali metal, alkaline earth metal or ammonium salts thereof, or (iii) from about 1 to about 10 parts by weight of magnesium oxide, said silica or calcium silicate having been mixed with said polymer A and said additive under conditions of shear at a temperature of from about 100° C. to about 190° C. prior to being mixed with the polymer B-carbon black mixture.

2. The vulcanizate of claim 1 wherein the styrene content of polymer A is from about 18 to about 30 weight percent.

3. The vulcanizate of claim 1 wherein polymer B is a styrene-butadiene polymer having a styrene content of from about 18 to about 30 weight percent.

4. The vulcanizate of claim 1 wherein the fillers are silica in an amount of from about 30 to about 75 parts by weight per 100 parts by weight of polymer A and carbon black in an amount of from about 30 to about 75 parts by weight per 100 parts by weight of polymer B.

5. The vulcanizate of claim 1 wherein polymer A is a styrene-butadiene-hydroxyethyl methacrylate polymer containing from about 18 to about 30 weight percent of styrene and from about 2 to about 60 millimoles of hydroxy groups per 100 grams of polymer, polymer B is a styrene-butadiene polymer containing from about 18 to about 30 weight percent of styrene, the fillers are silica in an amount of from about 30 to about 75 parts by weight per 100 parts by weight of polymer A and carbon black in an amount of from about 30 to about 75 parts by weight per 100 parts by weight of polymer B, the additive for the mixing of the polymer A and silica is an amine of formula R—$NH_2$ or R—NHR' wherein R is a $C_{10}$–$C_{20}$ linear or branched alkyl or alkylene group which may contain one $NH_2$ or NH group and R' is a $C_{10}$–$C_{20}$ linear or branched alkyl or alkylene group and the polymer A, silica and additive are mixed under conditions of shear at from about 120° to about 180° C. for from about 0.5 to about 5 minutes.

6. A process for the production of improved rubbery vulcanizates which process comprises the steps of (1) mixing for from about 0.25 to about 10 minutes under conditions of shear at a temperature of from about 100° to about 190° C. from about 20 to about 80 parts by weight of polymer A, said polymer A being a $C_4$–$C_6$ conjugated diolefin containing polymer which contains, per 100 grams of polymer, chemically bound in the polymer from about 1.5 to about 80 millimoles of hydroxy groups or from about 4 to about 60 millimoles of epoxy groups, with from about 5 to about 100 parts by weight per 100 parts by weight of polymer A of silica or calcium silicate and optionally an additive selected from (i) 0.5 to 5 parts by weight of an amine of the formula

R—$NH_2$, R—NHR' or R—NH"R'"

where R is a $C_4$–$C_{30}$ linear or branched alkyl or alkylene group which may contain one $NH_2$ or NH group or a $C_4$–$C_{30}$ cycloalkyl group or a $C_7$–$C_{20}$ alkaryl group connected to the nitrogen atom through the alkyl component of the alkaryl group, R' is a $C_1$–$C_{30}$ linear or branched alkyl or alkylene group and R" and R'", which may be the same or different, is a $C_1$–$C_{10}$ alkyl group, or (ii) from about 1 to about 5 parts by weight of an organic acid or salt thereof selected from the $C_{15}$–$C_{20}$ saturated or unsaturated fatty acids or the alkali metal, alkaline earth metal or ammonium salts thereof, or (iii) from about 1 to about 10 parts by weight of magnesium oxide, (2) allowing the mixture to cool and incorporating vulcanization active agents and optionally other compounding ingredients, (3) mixing from about 20 to about 80 parts by weight of polymer B, said polymer B being a $C_4$–$C_6$ conjugated diolefin containing polymer, with from about 5 to about 100 parts by weight per 100 parts by weight of polymer B of carbon black, (4) allowing the mixture to cool and incorporating vulcanization active agents and optionally other compounding ingredients, (5) mixing together the products from steps (2) and (4), the weight ratio therein of silica or calcium silicate to carbon black being from about 20:80 to about 65:35, shaping the mixture from step (5) and vulcanizing it by heating to a temperature of from 125° to about 200° C. for 1 minute to about 10 hours.

7. The process of claim 6 wherein polymer A is selected from styrene-butadiene-hydroxyethyl acrylate, styrene-butadiene hydroxyethyl methacrylate, styrene-butadiene-glycidyl acrylate, styrene-butadiene-glycidyl methacrylate and styrene-butadiene-methallyl glycidyl ether polymers wherein the styrene content is from about 18 to about 30 weight percent, polymer B is a styrene-butadiene polymer having a styrene content of from about 18 to about 30 weight percent and the fillers are silica in an amount of from about 30 to about 75 parts by weight per 100 parts by weight of polymer A and carbon black in an amount of from about 30 to about 75 parts by weight per 100 parts by weight of polymer B.

8. The process of claim 7 wherein the additive for the mixing of the polymer A and silica is an amine of formula R—$NH_2$ or R—NHR' wherein R is a $C_{10}$–$C_{20}$ linear or branched alkyl or alkylene group which may contain one $NH_2$ or NH group and R' is a $C_{10}$–$C_{20}$ linear or branched alkyl or alkylene group and the polymer A, silica and additive are mixed under conditions of shear at from about 120° to about 180° C. for from about 0.5 to about 5 minutes.

9. The process of claim 6 wherein the mixtures from step (2) and from step (4) both contain all compounding ingredients and vulcanization active agents and are mixed together in step (5) at a temperature below 75° C.

10. The process of claim 9 in which the final mixture from step (5) is vulcanized by heating at a temperature of from about 150° to about 170° C. for about 3 to about 60 minutes.

11. The process of claim 6 wherein polymer A is a styrene-butadiene-hydroxyethyl methacrylate polymer containing from about 18 to about 30 weight percent of styrene and from about 2 to about 60 millimoles of hydroxy groups per 100 grams of polymer, polymer B is a styrene-butadiene polymer containing from about 18 to about 30 weight percent of styrene, the fillers are silica in an amount of from about 30 to about 75 parts by weight per 100 parts by weight of polymer A and carbon black in an amount of from about 30 to about 75 parts by weight per 100 parts by weight of polymer B, the additive for the mixing of polymer A and silica is an amine of formula R—$NH_2$ or R—NHR' wherein R is a $C_{10}$–$C_{20}$ linear or branched alkyl or alkylene group which may contain one $NH_2$ or NH group and R' is a $C_{10}$–$C_{20}$ linear or branched alkyl or alkylene group, the polymer A, silica and additive are mixed under conditions of shear at from about 120° to about 180° C. for from about 0.5 to about 5 minutes and the final mixture from step (5) is vulcanized by heating at a temperature of from about 150° to about 170° C. for about 3 to about 60 minutes.

* * * * *